March 5, 1940.   O. A. PARKER   2,192,649
HOSE HOLDER
Filed May 31, 1938
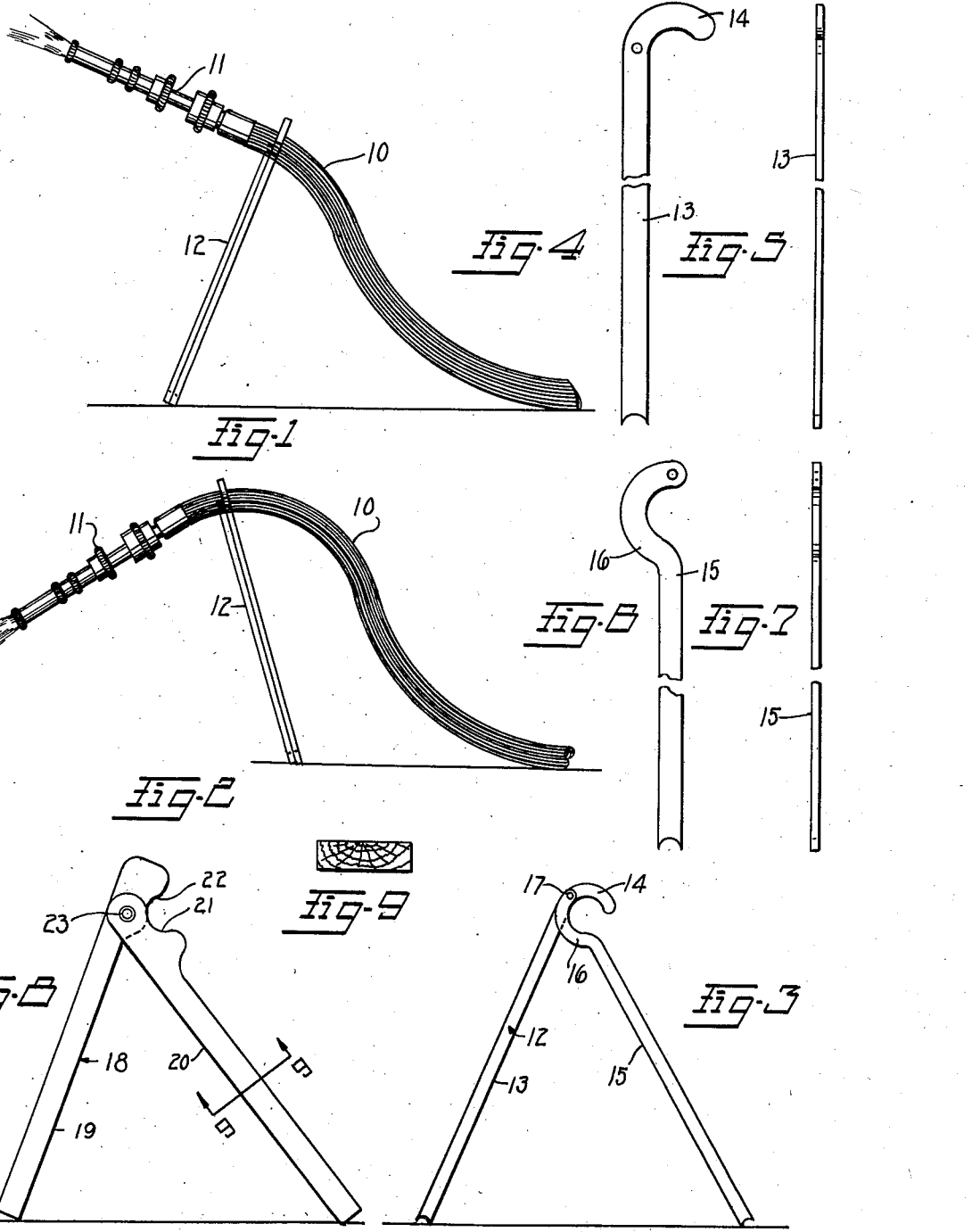
INVENTOR.
Orrel A. Parker
BY
Frank M. Slough
His ATTORNEY.

Patented Mar. 5, 1940

2,192,649

UNITED STATES PATENT OFFICE 2,192,649

HOSE HOLDER

Orrel A. Parker, Shaker Heights, Ohio

Application May 31, 1938, Serial No. 210,836

3 Claims. (Cl. 248—83)

This invention relates to hose holding devices, and more particularly to an improved device for holding garden hoses and the like.

I am familiar with prior hose holders of this general type comprising either a two or three point support and wherein the supporting arms are pointed to project into the ground. This type holding device has several disadvantages, in that, the lawn is marked by the pointed ends of the supporting arms and this condition is aggravated when the ground is moist due to sprinkling, or in hard ground it is difficult to insert the pointed ends of the arms. Additionally, the ends of the support arms do not afford the necessary traction when the holding device is placed on a hard surface such as concrete walk or driveway particularly since the nozzle end of the hose has a tendency to move due to variation in the water pressure. Also, many of these prior devices with which I am familiar rely on a scissors action to clampingly engage the hose and if the spacing between the portions of the support arms projected into the ground is incorrect, insufficient clamping action is provided and the hose will work loose from the holding device. The same result will occur if the supporting arms are allowed to relatively move through insecure ground engagement.

I am also familiar with hose holders employing a heavy base for stability but which are difficult to transport when moving the hose nozzle from place to place.

I have devised a hose holder of relatively simple construction which does not require that the arms be projected into a supporting surface and which may be employed on any type supporting surface, such as either concrete or lawn, the device comprising two arms forming two points of support and a portion of the hose forming a third supporting means. The weight of the hose and nozzle is utilized in effecting a secure clamping action between the device and the hose and any tendency of the supporting arms to spread at the points of engagement with the supporting surface increases the clamping action of the device on the hose.

Also, in my improved holder, a portion of one supporting arm is hooked over the top surface of the hose, and the hose is mainly supported by the other arm engaging the bottom surface of the hose, the arms being connected to achieve a maximum clamping action due to the weight of the supported hose.

The holder is preferably formed of relatively light metal such as duralumin and may be easily carried when moving the nozzle portion of the hose. Additionally, the holder permits the nozzle to be inclined at any desired angle either upwardly or downwardly since the holder together with a portion of the hose forms a tripod.

It is an object of my invention, therefore, to provide an improved holding device for a garden hose and the like.

Another object of my invention is to provide a hose holding device which is adapted to support a hose in a desired position for sprinkling either on a lawn or a relatively hard surface such as concrete.

Another object of my invention is to provide a holding device for a hose wherein the arms of the device provide two points of supports and a portion of the hose provides a third point of support.

Another object of my invention is to provide a holding device for a hose and wherein the weight of the nozzle and of a portion of the hose is employed in maintaining a clamping action of the device on the hose.

Another object of my invention is to provide a hose holder forming a tripod with a portion of the hose and which permits the nozzle to be easily adjusted to a desired angle.

Another object of my invention is to provide an improved clamping arrangement for a two-arm hose holder.

Another object of my invention is to provide a holding device for a hose which is economical of manufacture and assembly and which requires a minimum of room for storage.

Other objects of my invention and the invention itself will become increasingly apparent from a consideration of the following description and drawing wherein:

Fig. 1 is an elevational view showing the application of my holding device to a garden hose;

Fig. 2 is a view generally similar to Fig. 1, but illustrates the hose adjusted to a different position;

Fig. 3 is a front elevational view of the holding device;

Figs. 4 and 5 are front and side elevational views respectively of a supporting arm which I may employ; and Figs. 6 and 7 are front and side elevational views respectively of a cooperating supporting arm which I may employ;

Fig. 8 is a front elevational view of an embodiment of my invention; and

Fig. 9 is a cross sectional view taken on the line 9—9 of Fig. 8.

Referring now to the drawing, I have indicated in Fig. 1, a conventional garden hose 10, to which is detachably secured a preferably adjustable nozzle 11, the hose adjacent the nozzle being supported by a holding device generally indicated at 12. The holding device 12 comprises an arm 13 formed to provide a generally semi-circular end 14. A cooperating arm 15 has an end thereof curved laterally as indicated at 16, to cooperate with the end 14 of arm 12 in clampingly engaging the hose.

The arms are perforated whereby they may be pivotally secured together by a rivet or the like as indicated at 17. The end portions 14 and 16 of the arms preferably have a radius of curvature of $\frac{9}{16}$ of an inch whereby when the arms are disposed substantially in the position illustrated in Fig. 3, the end portions 14 and 16 will form the major portion of a circle conforming in size to the external diameter of a conventional garden hose.

The arms are preferably formed from straight strip material of a desired width and thickness, the strips being sheared to provide a rounded end at the curved ends of the arms resulting in an arcuate concave opposite end as indicated at 18. The arms are then preferably cold bent to the curved form shown.

The arms are drawn towards a longitudinally aligned position to permit the curved portions 14 and 16 to receive the hose therebetween and then spread substantially to the position illustrated in Fig. 3, to clampingly engage the hose.

The weight of the nozzle and of the hose portion extending from the supporting surface tends to increase the clamping engagement of the holding device with the hose, and due to the fact that the curved end 14 of arm 12 is disposed over the hose and that a major portion of the hose circumference is in engagement with the curved portions 14 and 16 of the arm, a secure grip is insured.

The holding device requires relatively little room for storage when the arms are aligned longitudinally, and I contemplate that steel or duralumin bar stock $\frac{3}{8}$ of an inch in width and $\frac{1}{8}$ of an inch in thickness will provide sufficient rigidity and strength for the purpose described. The device can securely grip and support hoses of different diameter than the conventional size garden hose, although I contemplate that if there is a substantial difference in the size of the hose employed, the radius of curvature of the end portions 14 and 16 may be correspondingly changed. It will be noted that the curved portion 16 of arm 15 is secured adjacent its end to the arm 13 at the zone of juncture of the straight and curved portions of arm 13 or substantially at the initiation of curved portion 14. Thus, when the arms are spread to the angularity of Fig. 3, the major portion of the hose bottom surface is supported by curved portion 16 and the top surface has the curved portion 14 hooked thereover. Due to the fact that the center of gravity of the supported hose portion is spaced from the point of pivotal connection of the arms, a levering action is exerted tending to spread the arms and increase the clamping grip of the device on the hose.

In the form of my invention shown in Figs. 8 and 9, the arms 18 and 20 are preferably formed of wood and the arm 18 is provided at its upper end portion with a curved hose receiving notch 22, which cooperates with a curved notch 21 of the arm 20 to clampingly engage the hose when the arms 18 and 20 are riveted together, as shown at 23, and employed in the manner of the hose receiving device of Fig. 3 to receive the hose.

Although I have shown and described a preferred form of my invention, I contemplate that numerous and extensive departures may be made therefrom without departing from the spirit of my invention and the scope of the appended claims.

Having thus described my invention, what I claim is:

1. A hose supporting device comprising a pair of terrene engaging arms pivotally connected at their upper ends, each of said arms comprising a straight portion and a substantially semi-circular portion, one semi-circular portion being adapted to be hooked over the top surface of a hose, the other semi-circular portion being adapted to support the bottom surface of the hose, and the portion supporting the bottom surface being pivotally connected adjacent its end to the other arm substantially at the juncture of the straight and semi-circular portions, the terrene engaging portions of the arms together with the pivoted joined portions of the arms constituting the sole support for the hose when in use, the weight of the supporting hose portion tending to spread the arms and to draw the semi-circular portions together to more tightly clamp the hose and more rigidly support the same.

2. A hose holding device comprising a terrene engaging arm having a curved portion adapted to engage the top surface of a hose a second terrene engaging arm having a reversibly curved portion adapted to support the bottom surface of a hose, and the second arm being pivotally secured to the first arm at a point spaced from the center of gravity of the supported hose, whereby a leverage action will be exerted on the arms due to the weight of the supported hose portion tending to spread the arms and to draw the curved portions together, to more tightly clamp the hose.

3. A hose supporter of the kind described comprising a pair of pivotally connected ground engaging arms, the end of one arm being pivotally secured to the other arm at a portion adjacent its end, the first said arm having a notched portion adjacent its pivotal connection with the second arm adapted to seat the hose therein, and said second arm having a hooked end portion adapted to clamp said hose when the hose is placed upon the seat of the first arm, the pivotal connection and the two ground engaging ends of the arms forming a three point support for the hose.

ORREL A. PARKER.